(12) United States Patent
Sternowski

(10) Patent No.: US 7,656,909 B1
(45) Date of Patent: Feb. 2, 2010

(54) SELF-STEERING AUTOPLEXER FOR TRANSMITTER MULTICOUPLING

(75) Inventor: Robert H. Sternowski, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1313 days.

(21) Appl. No.: 10/430,038

(22) Filed: May 5, 2003

(51) Int. Cl.
*H04J 3/04* (2006.01)
(52) U.S. Cl. .................................................. 370/535
(58) Field of Classification Search ............... 370/297, 370/535
See application file for complete search history.

(56) References Cited

U.S. PATENT DOCUMENTS

| | | | | |
|---|---|---|---|---|
| 4,197,540 A | * | 4/1980 | Riggs et al. ................. | 342/201 |
| 4,240,155 A | * | 12/1980 | Vaughan ...................... | 370/297 |
| 5,021,756 A | * | 6/1991 | Tajima et al. ................ | 333/132 |
| 5,838,675 A | * | 11/1998 | Rauscher ..................... | 370/343 |
| 5,930,266 A | * | 7/1999 | Ramsey et al. ............... | 370/480 |
| 7,324,604 B2 | * | 1/2008 | Molisch et al. .............. | 375/296 |

* cited by examiner

*Primary Examiner*—Kwang B Yao
*Assistant Examiner*—Juvena Loo
(74) *Attorney, Agent, or Firm*—Matthew J. Evans; Daniel M. Barbieri

(57) ABSTRACT

A self-steering autoplexer for transmitter multicoupling has a linear summer for summing transmit signals at several frequencies. An input demultiplexer uses input diplexers to separate and route the transmit signals by frequency. Amplifiers amplify the separated transmit signals from the input demultiplexer. An output multiplexer uses diplexers to combining the amplified and separated transmit signals into a combined transmit signal for transmission by an antenna. The output multiplexer may have an even multiplexer for combining the transmit signals into even band transmit signals for transmission by an even band antenna and an odd multiplexer for combining the transmit signals into odd band transmit signals for transmission by the antenna. The input diplexers of the input demultiplexer comprise diplexers connected such that the transmit signals are applied to outputs of the diplexers to separate the transmit signals into low and high frequency signals.

19 Claims, 6 Drawing Sheets

SELF-STEERING AUTOPLEXER FOR TRANSMITTER MULTICOUPLING

BACKGROUND OF THE INVENTION

This invention relates to radio communications systems, methods of coupling multiple transmitters to a single antenna, and specifically to a self-steering autoplexer for transmitter multicoupling.

The military has long sought a method for multicoupling many transmitters to a single antenna, ideally minimizing the cosite interference generated via some attribute of the multicoupling scheme as well as minimizing the mechanical structure and observability. Traditionally, manually tuned filters were combined into a single antenna as a multicoupler array, typically up to four to eight channels in HF, VHF or UHF bands. Operating such an array was an expensive, slow, operator-intensive, mechanically tuned process that was adequate when fixed-frequency operation was the norm. Today, however, the environment is much different, with a variety and increased quantity of channels needed for joint service and coalition communications, as well as the advent of fast frequency hopping systems and pressure to reduce crew size. The former increases the complexity of a multicoupling scheme due to the additional frequently-changing channels, and the latter the potential for interference, assuming that a frequency hopping multicoupler can be built at all.

New requirements for programs such as the US Navy Cluster M maritime and fixed site communications program are to multicouple on the largest ship on the order of 20 HF, 20 UHF and as many as 40 VHF transceivers to as few antennas as possible, and to simultaneously eliminate or minimize any interference among them. Those 80 channels may be any combination of hopping or non-hopping transmitters and receivers.

Current technical approaches for multicoupling these quantities of channels are typically implemented on a band-by-band basis due to the added complexity of multiband multicoupling. Current approaches include a hopping filter/multicoupler, a power bank amplifier, antenna isolation, and simple hybrid combining discussed in the following paragraphs.

The hopping filter/multicoupler approach is an electronically-tunable reincarnation of the traditional mechanically-tuned transmit multicoupler, using PIN diode tuned filters. Unfortunately, due to the low Q-factor of PIN diodes, these filters are very lossy, very large, and not very selective. The current four-channel FHMUX VHF SINCGARS multicoupler is an example of this technology.

A power bank amplifier is another alternative that linearly sums all the low-level transmit signals into a single large power amplifier, causing all the signals to emerge at once from one power amplifier output to be applied to one antenna. Unfortunately, there are two major flaws in this scheme. The low-level signals mix with each other via the non-linearity of the amplifier and generate a large number of intermodulation distortion products that are amplified and radiated together with the desired signals and that then interfere with many receive channels. The amount of power per channel is limited to $1/N^2$, where N is the number of simultaneous signals. This is because the input signals add vectorally, and the maximum output power is limited to the peak vector sum of all signals, not the average power. This causes power division by the square of the number of signals and can be a very severe communications impediment when there are many signals.

The antenna isolation approach is a traditional method where separate antennas spaced apart are used. This is not an option when the goal is to reduce the number of antennas on an already small platform such as a ship.

The simple hybrid combining approach is another classical method of multicoupling by combining multiple transmitters through hybrids, which are nothing but RF transformers. This approach is simple, frequency hopping compatible, broadband, but inefficient since the combined signals are independent and non-coherent, each transmitter is effectively double-terminated by the hybrid, and hence half the power (−3 db) is lost as heat dissipation for each level of hybrid combining. A current shipboard HF system combines hybrid combining with a power bank amplifier resulting in a system that performs poorly because multiple signals and the hybrid losses result in so little power output per channel that the ships cannot communicate with anyone.

Currently there is no solution offered that results in acceptable transmitter multicoupling performance when accounting for wide bandwidths, multiple bands, frequency hopping, limited platform size, low observable antennas, and usable power output.

SUMMARY OF THE INVENTION

A self-steering autoplexer for transmitter multicoupling is disclosed. The self-steering autoplexer comprises a linear summer for summing a plurality of transmit signals at a plurality of transmit frequencies. An input demultiplexer, connected to the linear summer, comprises a plurality of input diplexers for separating and routing the transmit signals by frequency. A plurality of amplifiers connected to the input demultiplexer amplify the separated transmit signals from the input demultiplexer. An output multiplexer is connected to the plurality of amplifiers and comprises a plurality of diplexers for combining the amplified and separated transmit signals into a combined transmit signal for transmission by an antenna.

The output multiplexer may comprise an even multiplexer for combining the amplified and separated transmit signals into even band transmit signals for transmission by an even band antenna and an odd multiplexer for combining the amplified and separated transmit signals into odd band transmit signals for transmission by the antenna.

The input diplexers of the input demultiplexer comprise diplexers connected such that the plurality of transmit signals at the plurality of frequencies from the linear summer are applied to outputs of the diplexers to separate the transmit signals into low and high frequency signals appearing at the inputs of the diplexers. The input diplexers comprise low pass filters for passing low frequency transmit signals and high pass filters for passing high frequency signals. The low pass filters and the high pass filters are connected together and have the plurality of transmit signals applied to the high pass filter and low pass filter connection to provide the separated transmit signals.

Each of the plurality diplexers may comprise a low pass filter for passing low frequency signals and a high pass filter for passing high frequency signals. The low pass filter is connected to the high pass filter to provide the combined transmit signal. Each of the plurality of diplexers may comprise a low frequency bandpass filter for passing low frequency signals and a high frequency bandpass filter for passing high frequency signals. The low frequency bandpass filter is connected to the high frequency bandpass filter to provide the combined transmit signal.

It is an object of the present invention to provide a transmitter multicoupler that is a novel combination of known technologies that overcomes most of the limitations of conventional methods.

It is an object of the present invention to provide a self-steering autoplexer that provides acceptable transmitter multicoupling performance with wide bandwidths, multiple bands, frequency hopping, and usable power output on limited size platforms with low observable antennas.

It is an advantage of the autoplexer scheme of the present invention to be scaled to as many or few channels as required and be scaled to one or more antennas of any type as required.

It is an advantage of the present invention all intermodulation distortion products other than odd orders about the fundamental are attenuated by autoplexer filtering and that all harmonics are attenuated by diplexer responses.

It is an advantage of the present invention to provide zero tune time to accommodate push to talk transmission through any frequency hop speed.

It is a feature of the present invention to provide an autoplexer that is radio-transparent, requires no digital interface to radios and can be used interchangeably with any make or mix or model of radio.

It is a feature of the present invention to be waveform-transparent to work with any type signal or modulation, within the bounds of selected amplifiers.

It is a feature of the present invention to operate at any power level of amplifier with size, weight, and cost varying with power level.

BRIEF DESCRIPTION OF THE DRAWINGS

The invention may be more fully understood by reading the following description of the preferred embodiments of the invention in conjunction with the appended drawings wherein:

FIG. 1a is a block diagram showing a diplexer utilized in the present invention showing low pass and high pass filters;

FIG. 1b is a graph showing the low pass and high pass filter characteristics of the diplexer of FIG. 1a;

FIG. 2 is a block diagram of combining system using a diplexer tree multiplexer made up of the diplexers shown in FIG. 1a;

FIG. 3 is a block diagram of dual antenna multiplexer using the diplexers of FIG. 1a;

DETAILED DESCRIPTION

A self-steering autoplexer method and apparatus for transmitter multicoupling is disclosed that is a novel combination of known technologies that overcomes most of the limitations of the conventional methods.

The present invention is a novel variation of an analog multiplexer, wherein multiple signals at different frequencies are linearly summed together to a common output by means of a passive frequency selective network. The frequency selective network consists of a tree of diplexers. A diplexer known in the art is a two-input/one-output multiplexer that is the basic building block of the present invention. Signals at different frequencies are applied to the diplexer network input ports and the combined signals appear at a single output port of the network. The diplexer may also be applied in reverse. A plurality of signals applied to the output port is passed to the two input ports and are separated according to their frequency and the diplexer characteristics.

Figures 1A, 1B:
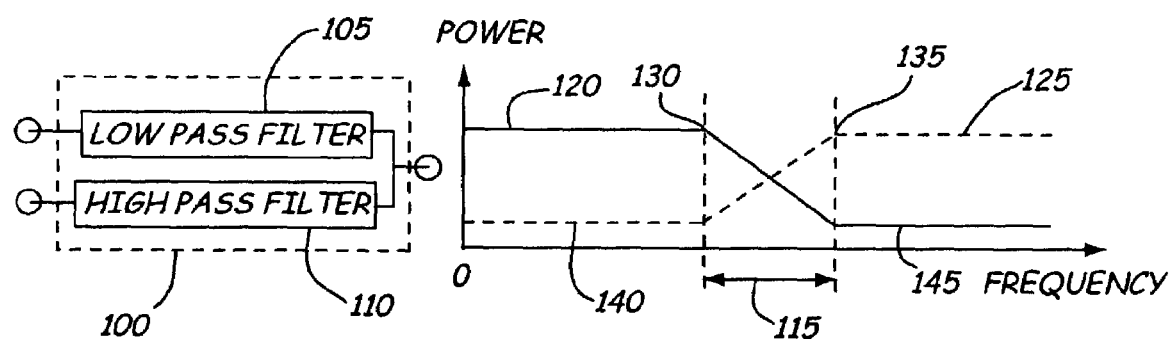

Referring to FIG. 1a, the diplexer 100 is simply a low pass filter 105 and a high pass filter 110 with the filter outputs connected in parallel resulting in an output that is a sum of the low pass 105 and high pass 110 filter outputs. Diplexers are commercially available. Diplexers may be implemented with band pass filters with low and high center frequencies in place of the low pass filter 105 and high pass filter 110 of FIG. 1a. To a first transmitter (not shown) whose signal is present within a low-loss passband of the low pass filter 105, and thus effectively coupled to an output load (not shown), a second transmitter (not shown) connected to the high pass filter 110 is effectively not present because the second transmitter is separated by the stop band attenuation of the high pass filter 110, whose output impedance in the stop band is a high impedance relative to a 50-ohm impedance of a standard transmitter system. The same is true of the second transmitter in the pass band of the high pass filter 110. The second transmitter is isolated from the first transmitter by the stop band high impedance of the low pass filter 105.

Shown in FIG. 1b are a low pass filter characteristic 120 and a high pass filter characteristic 125 for the filters 105 and 110 of FIG. 1a. A limitation with the diplexer 100 is the need for a guard band 115, that is, the crossover region between a low pass filter 105 bandpass corner 130 and a high pass filter 110 bandpass corner 135. In order to achieve isolation in the passbands of both filters 105 and 110, corner frequencies 130 and 135 must be separated, and this results in a crossover zone or guard band 115 where the filters become lossy and isolation between transmitters worsens. The guard band 115 is typically a forbidden band for transmit operations because of the loss and commensurate power dissipation, and hence a traditional diplexer tree or multiplexer has select bands where transmission is not allowed. The width of these guard bands 115 may be designed to meet the desired system operational specifications; typically, guard bands 115 are 5 to 10% of the center frequency in width using inductor/capacitor filter implementations.

Figure 2:
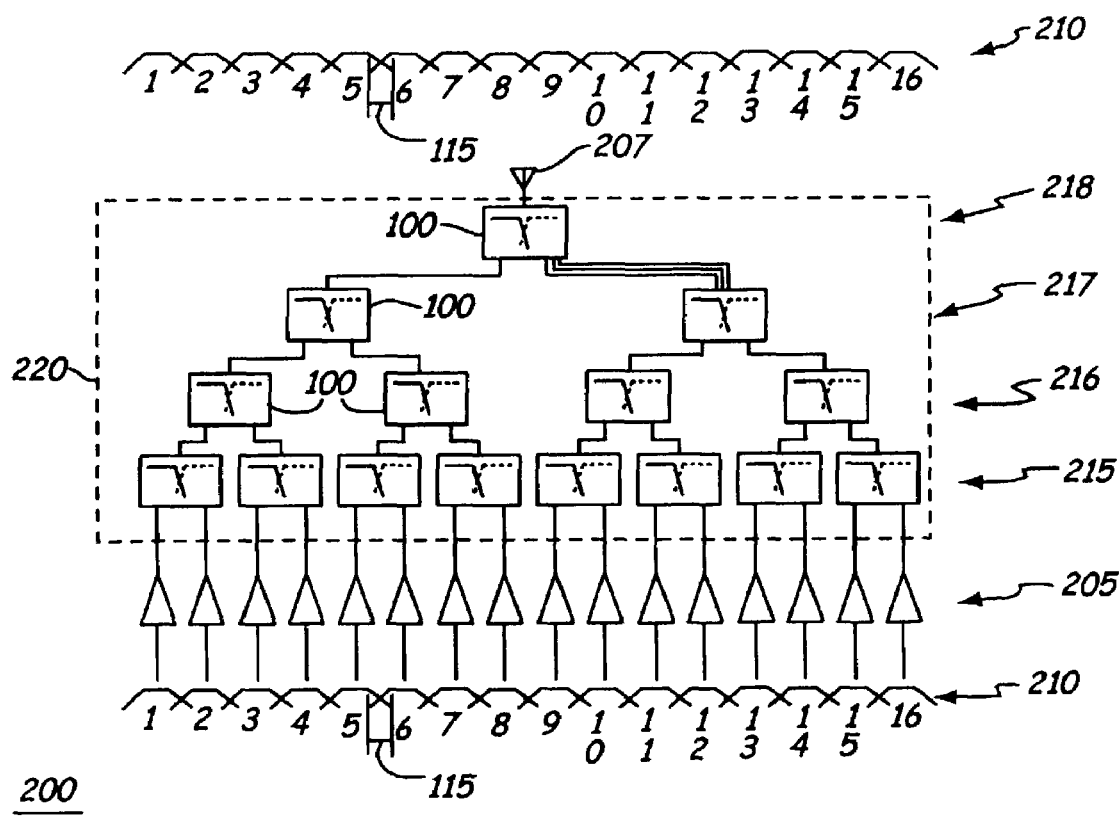

FIG. 2 is a diagram showing a combining system 200 with a diplexer tree multiplexer 220 made up of diplexers 100, combining sixteen transmitters 205 into one antenna 207 in this example. The guard-bands 115 are shown in the overlaid spectrum diagrams 210 showing the passband 1-16 of each diplexer 100 bandpass filter. Advantages of the multiplexer 220 include no peak envelope power dilution as in a power bank, no switching, no tune time with fixed tuned networks, scalable to a desired number of channels, typical 0.25 dB loss per diplexer layer 215-218, and functional equally well with frequency hopping or PTT (push-to-talk) radios.

In the multiplexer 220 of FIG. 2, each transmitter 205 is isolated from other transmitters 205 by a sum of the isolation of each diplexer layer 215, 216, 217, and 218 its signal passes through. Additionally, the multiplexer 220 serves as a bandpass filter to each transmitter 205, thereby attenuating any harmonics, broadband noise, intermodulation products, and spurious signals emanating from that transmitter 205 and otherwise falling outside the passband of a multiplexer channel, which is the cascade response of the path through the multiplexer 220 for that channel. To each transmitter input to a diplexer 100, the opposite diplexer input channel appears as a very high impedance in series with the other transmitter (1,000,000 ohms represents approximately 60 db of typical stop band isolation), while having zero (theoretical) loss in the passband. In the guard band 115, each transmitter 205 sees a very small isolation impedance in series with the other transmitter 205, allowing a significant portion of the first transmitter's output power to couple into the output impedance of the second transmitter, causing both excess dissipation in the diplexer 100 as well as mixing to cause intermodulation products in the second transmitter. The second transmitter has the same adverse impact on the first.

Figure 3:
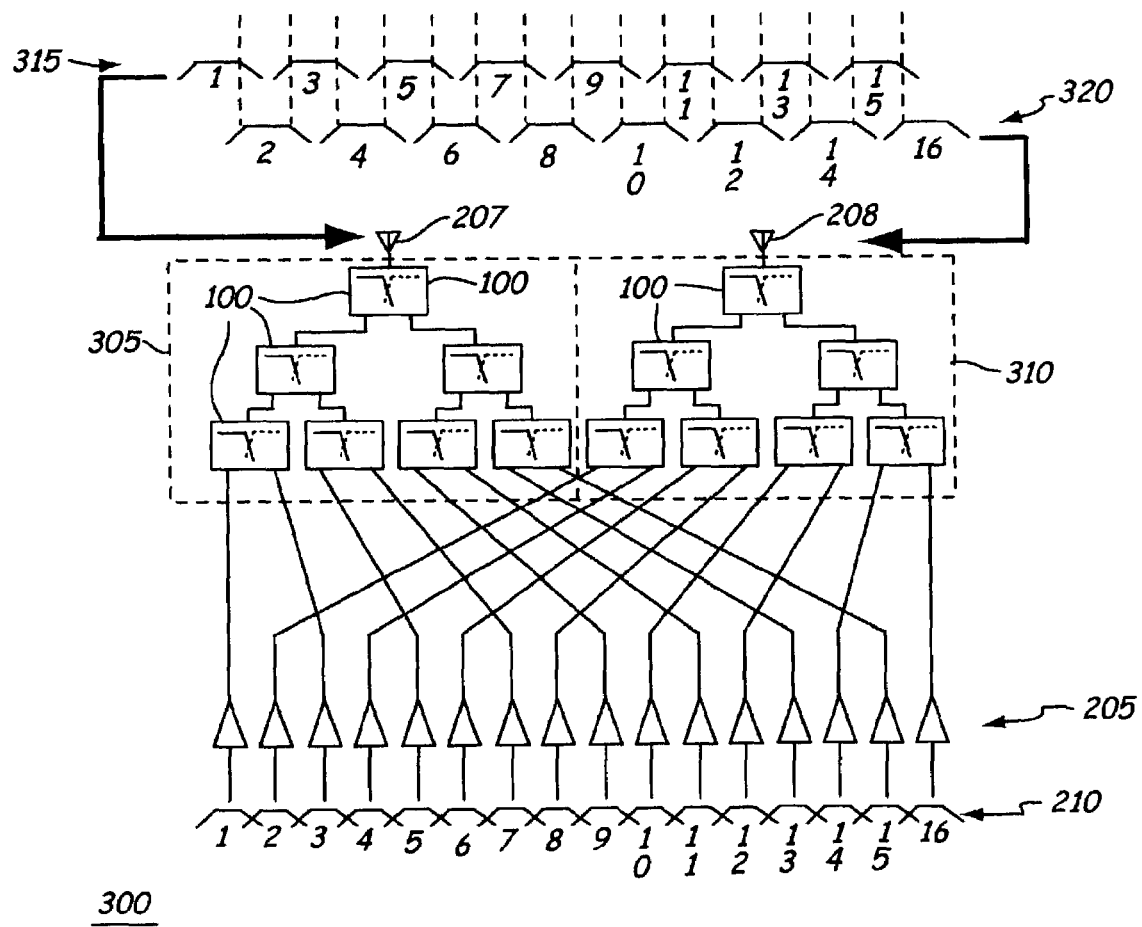

FIG. 3 shows a split or dual antenna multiplexer architecture 300. This architecture 300 is identical to the single antenna multiplexer architecture 200 of FIG. 2, except that the original multiplexer 220 is reorganized into two separate multiplexers 305 and 310, each with one less layer, and each feeding a single antenna 207 and 208. The architecture 300 can be expanded to any number of antennas. The advantage to using two antennas 207 and 208 is that the input spectrum 210 odd multiplexer bands 1, 3, 5, etc. as shown in spectral diagram 315 from odd multiplexer 305 are connected to the antenna 207 that transmits odd band signals, while the diplexer 100 guard bands 115 fall into even multiplexer bands 2, 4, 6, etc. as shown in spectral diagram 320 in even multiplexer 310. The even band antenna 208 has the even multiplexer 310 bands connected to it, while the diplexer 100 guard bands fall into the odd multiplexer 305 bands. The net effect is that there are no forbidden transmit guard bands 115. Each multiplexer 305 and 310 and antenna 207 and 208 is the complement of the other in frequency passband and stop bands.

To utilize these multiplexers, whether it is with the single antenna architecture 200 or multiple antenna architecture 300, a transmitter 205 is connected or otherwise switched into a desired channel input according to a selected frequency. Thus a high-power switch matrix (not shown) is required to automate the switching function as the frequency changes. Alternatively, one power amplifier 205 could be dedicated to each channel and low-level exciter drive signals switched among them with a far less expensive switch matrix, but at the expense of additional amplifiers that may end up being underutilized. However, this whole problem becomes very complicated when frequency hopping is required of the system. The switch has to be driven by frequency information from each radio, and has to be fast enough to follow the hop speed.

Figure 4:
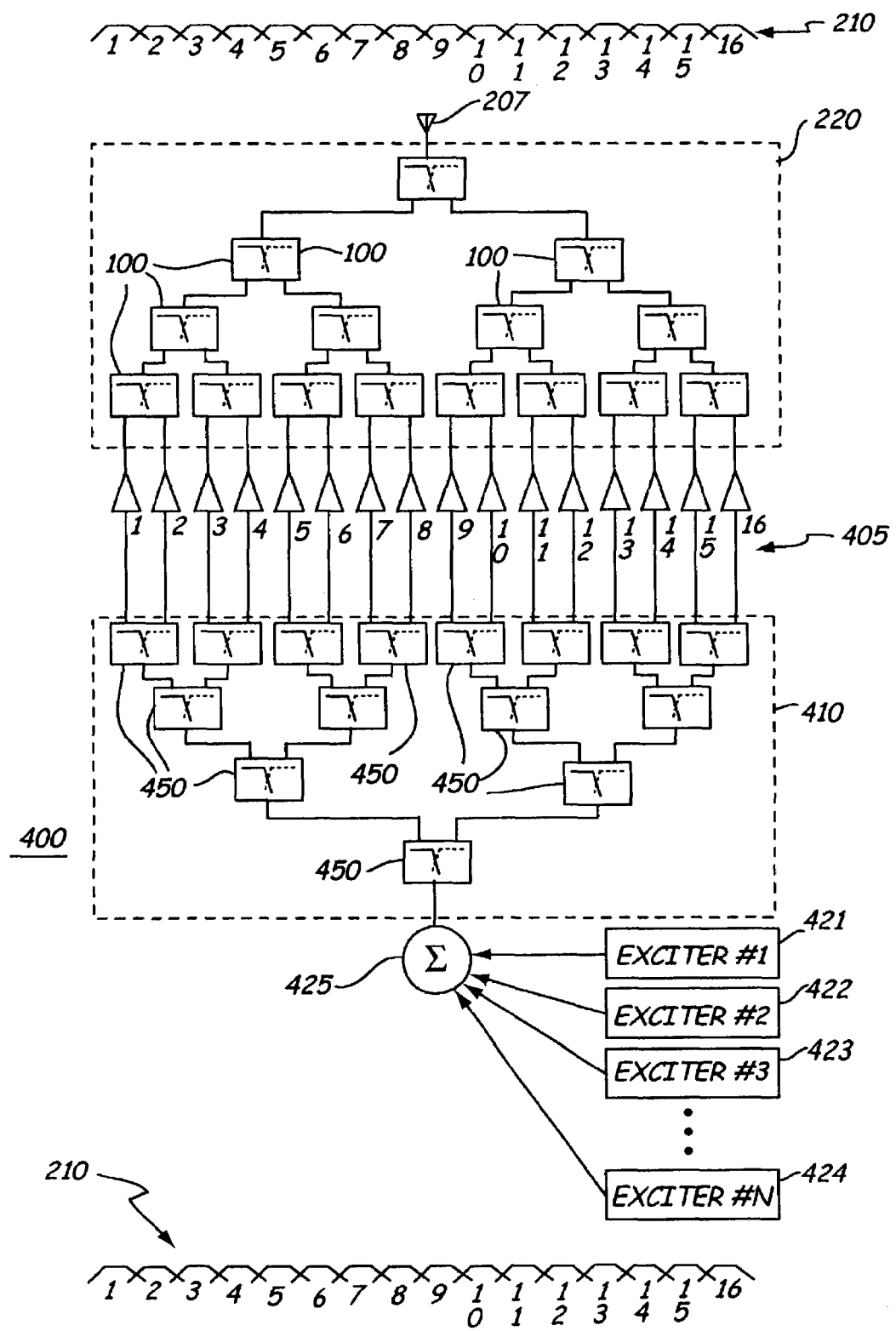
FIG. 4 is a block diagram of single antenna autoplexer of the present invention employing an input demultiplexer.
Figure 5:
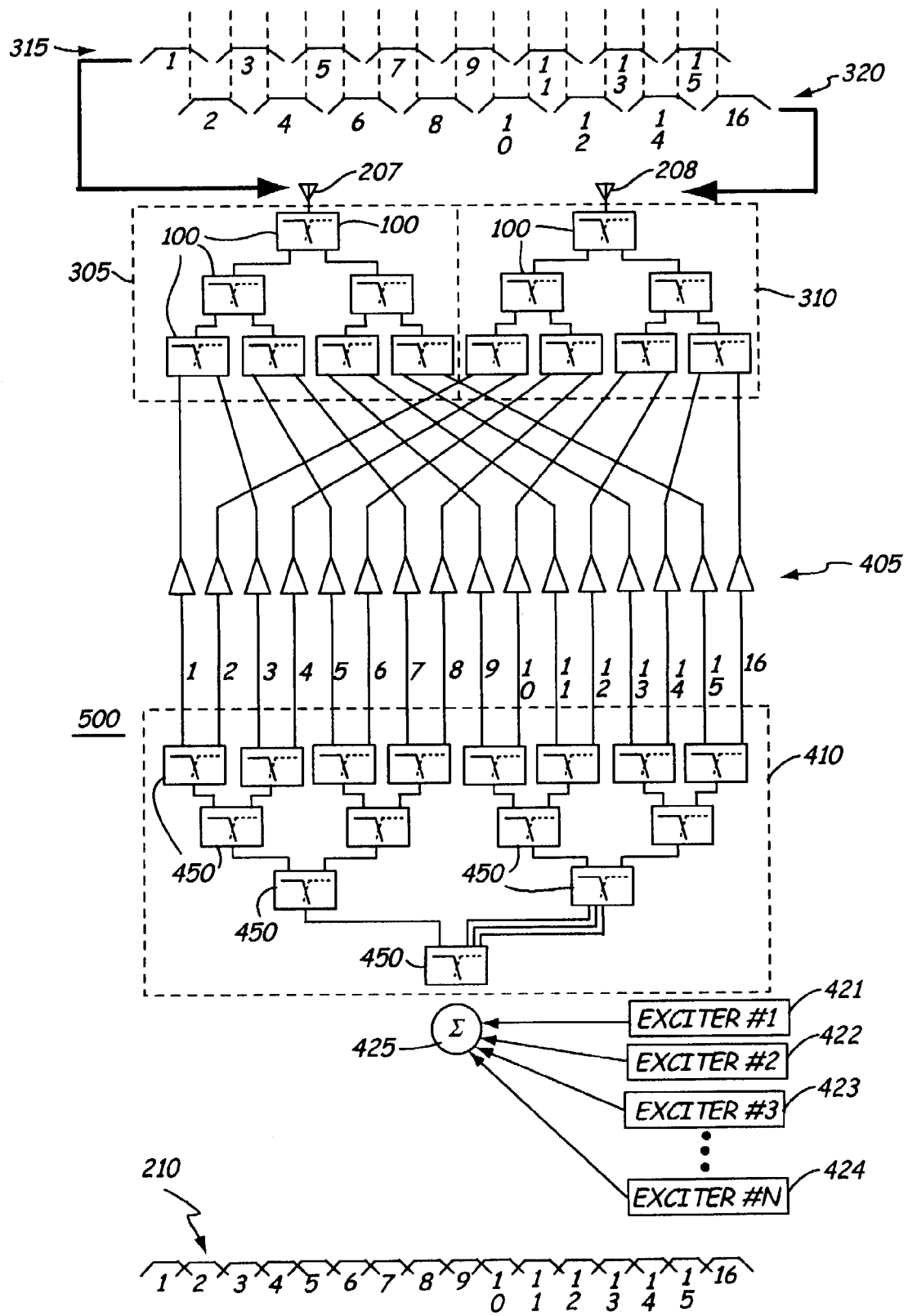
FIG. 5 is a block diagram of a dual antenna autoplexer of the present invention employing an input demultiplexer.

A novel solution to this complexity is to add an input demultiplexer 410 to the single antenna architecture 200 of FIG. 2 and multiple antenna architecture 300 of FIG. 3, resulting in a single antenna autoplexer 400 in FIG. 4 and a dual antenna autoplexer 500 shown in FIG. 5. The input demultiplexer 410 comprises input diplexers 450 that are diplexers 100 of FIG. 1 connected in reverse such that a summed signal from a linear summer 425 or other input diplexers 450 at two or more transmit frequencies is applied to the output of the diplexers 100 as used as the multiplexer 220. The summed signal is separated into low and high frequency signals by the low pass filter 105 and high pass filter 110 and the separated low and high frequency signals are available at the two inputs of diplexers 100 as used in multiplexer 220. The transmit signals pass through the diplexers 450 until only one transmit signal within that diplexer band from exciters 421-424 is available the input demultiplexer 410 outputs.

In the single antenna autoplexer 400, sixteen dedicated channel amplifiers 405 are connected between the input demultiplexer 410 outputs and the output multiplexer 220, such that each amplifier 405 is dedicated to always amplifying one multiplexer band 1-16. In the dual antenna autoplexer 500 in FIG. 5, sixteen channel amplifiers 405 are also permanently connected between the input demultiplexer 410 and odd multiplexer 305 and even multiplexer 310. The combination in FIGS. 4 and 5 of dedicated amplifiers 405, input demultiplexers 410 and output multiplexers 220, 305, and 310 are referred to here as autoplexers 400 and 500 respectively. The number of multiplexer bands 1-16 and channel amplifiers 405 may be increased or reduced to meet system requirements and still be within the scope of the present invention.

Low-level transmit signals, each generated by a separate source such as the exciters 421-424 and comprising any combination of hopping and non-hopping signals of differing contents and bandwidths, are linearly summed in linear summer 425, preferably through isolation attenuators (not shown) to preclude generating intermodulation distortion in the exciters 421-424, and then applied to an input port of the input demultiplexer 410. Linear summer 425 may typically be a resistive or hybrid summing circuit of known design. Each transmit signal is separated and automatically routed by frequency to a proper multiplexer channel amplifier 405 by the input demultiplexer 410, a passive frequency selective input diplexer tree. The separated transmit signals are amplified by amplifiers 405 and then applied to the output multiplexer 220 in the autoplexer 400 in FIG. 4 where the amplified transmit signals are combined with other amplified transmit signals and then the combined transmit signal applied to the antenna 207 through the frequency selective network of the output multiplexer 220.

In the autoplexer 500 of FIG. 5 the amplified transmit signals from channel amplifiers 405 are applied to even multiplexer 305 or odd multiplexer 310 as appropriate, combined and then the combined transmit signal is applied to antenna 207, functioning as the odd band antenna, or even band antenna 208. As the frequency is changed during frequency hopping by an exciter 421-424, it is routed through the appropriate autoplexer path 1-16 and amplifier 405 at the speed of light (less any system propagation delays) without any need for switching; the frequency selective nature of the input diplexer 450 trees performs the switching.

The autoplexers 400 and 500 of the present invention combine the basic principles of a frequency selective multicoupler with a bandlimited power bank amplifier. Possible implementations of an autoplexer 400 and 500 is discussed in the following example of a US Army SINCGARS (Single Channel Ground Air Radio System in the 30- to 88-MHz band) command node application, where 29 SINCGARS transmitters must be operated simultaneously, preferably via one or two antennas 207 and 208. The number of transmitters may be increased or decreased in other applications. The present invention applies to other frequency bands as well.

The exciters 421-424 in FIGS. 4 and 5 are replaced by twenty-nine SINCGARS transceivers. The twenty-nine low-level drive signals from the SINCGARS transceivers are linearly summed via linear summer 425 and applied to the input demultiplexer 410. Receive inputs are supplied from a receive antenna and splitter (not shown) that are electrically and physically isolated from the transmit antenna 207 and are not a part of this system or discussion.

At any instant of any hop dwell of any of the twenty-nine transceiver signals, each signal will fall into only one input demultiplexer band 1-16, be amplified by only one channel amplifier 405, and fall into only one output multiplexer (220, 305 and 310) band before being applied to one antenna 207 or 208. In effect, the frequency-selective input demultiplexer 410 performs the switching and routing of the transceiver signal to the correct amplifier 405 and output multiplexer (220, 305 and 310) channel, but does so instantaneously without actually switching anything. As the system frequency hops and the transceiver signal frequencies change, the signals are automatically routed to the proper band as fast as they change. If a constant push-to-talk (PTT) non-hopping transceiver signal is added to the mix, it too will automatically route through the autoplexer 400 or 500 according to its unvarying frequency.

In consideration of the power bank aspects of the autoplexers 400 and 500, use of a 100-watt peak envelope power (PEP) (as opposed to continuous or CW) amplifier for each channel amplifier 405 is assumed. In the frequency hopping scenario, each transceiver 421-424 is driven by a pseudo-random number generator (not shown) such that the hop frequency can randomly be on any frequency in the autoplexer bands 1-16 with equal probability. The probability that each hop signal will be in the same multiplexer band 1-16 at any instant is very small. If a 10-watt output power is needed for each SINC-GARS channel, a typical output power, and the 100-watt PEP amplifier 405 is used with the gain set accordingly for the drive signal from the transceivers 421-424, then if there is one signal, the amplifier 405 can provide 10 watts per channel (with 90 watts of unused margin); if there are two signals in the band, there will still be 10 watts per channel (40 watts PEP in the amplifier); three signals present result in 10 watts per channel (90 watts PEP in the amplifier); but when four signals are present the PEP of the amplifier is exceeded (160 watts PEP required with 100 watts PEP available) and the average power per channel is 6.25 watts, 4 watts for five signals, 2.8 watts for six signals, etc., as the available PEP is divided by the square of the number of simultaneous signals present in the amplifier. However, applying the joint probability that N signals will be present in a given band at any instant with the joint probability that a particular number of transceivers are active (as opposed to receiving), the percentage of time during which all twenty-nine bands will have less than ten watts per channel can be computed. The number of multiplexer bands and the channel amplifier 405 power can be tailored to the necessary statistical average power per channel and the statistical number of active transceivers. PTT transceivers can be mixed into this probability as required with similar impact.

The statistical treatment of this scenario is as follows: the problem is to find the probability that any one autoplexer 400 or 500 has K transceivers present at any instant. This is simply the classical probability problem of determining how many balls will randomly fall into one bin, given a population of n balls and m bins. In this case, the same analysis to determine how many K of a population of transmitters N fall into a population of equal multiplexer bands M is used. This relationship is given by the mathematical relationship (from: Feller, William, p. 34, *An Introduction to Probability Theory and Its Applications*, Wiley & Sons, 1950):

$$P(K)=[N!*(M-1)^{N-K}]/[K!*(N-K)!*M^N]$$

Where:

K = Number of transmitters present in one multiplexer band
P(K) = Probability that exactly K transmitters are instantaneously present in one multiplexer band
N = Number of simultaneous transmitters in the system with equally distributed random frequencies
M = Number of equal spaced multiplexer bands The results of this statistical analysis are shown in a table below. This table shows the results for a 16-band autoplexer system (400 or 500) with 29 transceivers 412-424, representing a typical SINCGARS or HAVE QUICK (military UHF 225- to 400-MHz frequency hopping system) scenario at a command and control node. The first column shows the number of transceivers simultaneously present in an autoplexer band 1-16, the second column the probability of that number of transceivers being present in one band at any instant in time, and the third column the cumulative probability that 0 ... K transceivers are present in that band at any instant. The first set of columns represents a system of 29 transceivers 421-424 all transmitting simultaneously, while the remaining column sets (from left to right) represent 22 (75%), 15 (50%), and 8 (25%), respectively, transceivers, corresponding to 100, 75, 50, and 25% of the transceivers active at any instant. It should be noted that an even distribution of pseudorandom hopping frequencies typical of modern systems is assumed.

| Xmtrs = | 29 | | 22 | | 15 | | 8 | |
| Bands = | 16 | | 16 | | 16 | | 16 | |
| Taken: | P (k) | Cum P (k) | P (k) | Cum P (k) | P (k) | Cum P (k) | P (k) | Cum P (k) |
| --- | --- | --- | --- | --- | --- | --- | --- | --- |
| 0 | 0.153875 | 0.153875 | 0.241751 | 0.241751 | 0.379812 | 0.379812 | 0.596719 | 0.596719 |
| 1 | 0.297491 | 0.451366 | 0.354568 | 0.596319 | 0.379812 | 0.759625 | 0.31825 | 0.91497 |
| 2 | 0.277658 | 0.729024 | 0.248198 | 0.844516 | 0.177246 | 0.936871 | 0.074258 | 0.989228 |
| 3 | 0.166595 | 0.895619 | 0.11031 | 0.954826 | 0.051204 | 0.988075 | 0.009901 | 0.999129 |
| 4 | 0.072191 | 0.96781 | 0.034932 | 0.989758 | 0.010241 | 0.998316 | 0.000825 | 0.999955 |
| 5 | 0.024064 | 0.991874 | 0.008384 | 0.998142 | 0.001502 | 0.999818 | 4.4E-05 | 0.999999 |
| 6 | 0.006417 | 0.998291 | 0.001584 | 0.999725 | 0.000167 | 0.999985 | 1.47E-06 | 1 |
| 7 | 0.001406 | 0.999696 | 0.000241 | 0.999966 | 1.43E-05 | 0.999999 | 2.79E-08 | 1 |
| 8 | 0.000258 | 0.999954 | 3.02E-05 | 0.999997 | 9.54E-07 | 1 | 2.33E-10 | 1 |

Based on the table, it can be seen that if maintaining per-channel average power is the most important constraint, then for a 29 transceiver 421-424 and 16 band system there is a 90% probability of having three or less transceivers in one autoplexer band with 29 active transceivers, three or less with 22 active, two or less with 15 active, and one with eight transceivers active. At the 99% level, the active numbers are five, five, three, and two per band for 29, 22, 15 and eight active transceivers, respectively. This dictates that for 90% probability of unreduced power output per channel with 29 active transceivers 421-424, the channel amplifier 405 must be PEP rated at 3·3=9 times the per channel power. This falls to factors of nine, four and one for 22, 15 and eight active transceivers, respectively. This says that for constant 10-watt outputs, the autoplexer amplifiers 405 need only have PEP ratings of 90, 90, 40 and 10 watts, respectively. At VHF/UHF, these are small and affordable amplifier modules.

The autoplexer architectures 400 and 500 offer advantages such as scalability to as many or few bands as required and scalability to one or more antennas as required. Any power level of amplifier can be used in the autoplexer architectures 400 and 500 with size, weight and cost varying with power level. Typical diplexers 100 have a 0.2 db loss with total loss being the sum of layers of diplexers 100 a signal transits. The autoplexers 400 and 500 can be scaled for any frequency band or even multiband operation. All intermodulation distortion (IMD) products other than the odd order products about the fundamental are attenuated by the autoplexer filtering. Only in-band IMD products will exist at the autoplexer output. All harmonics are attenuated by the diplexer 100 responses. The autoplexers 400 and 500 have zero tune time and can accommodate PTT operation through any frequency hop speed. The multiplexers 220, 305, 310, and 410 are completely passive. The autoplexers 400 and 500 are radio-transparent meaning that they require no digital interface to transceivers, hence they can be used interchangeably with any make or mix or model of transceiver. The autoplexers 400 and 500 are waveform-transparent meaning that the linear, passive autoplexer works with any type signal or modulation, within the bounds of the selected amplifiers 405. The autoplexers 400 and 500 can be reconfigured in place, either in emergency or for up/downgrade of system architecture. The size of the autoplexers 400 and 500 is inversely proportional to frequency. The autoplexers 400 and 500 will work with any kind of antenna(s).

Nothing is a panacea, and the autoplexers 400 and 500 are no exception. The disadvantages of the autoplexer scheme are that one amplifier 405 for each multiplexer band 1-16 is required but the number of bands and amplifiers versus amplifier power rating can be traded-off via a statistical analysis. Exceeding the PEP rating of the amplifier 405 will reduce the per-channel output power for only a hop dwell.

Careful attention must be paid to guard band 115 frequency placement in the autoplexers 400 and 500. While the output bands 1-16 can be staggered to multiple antennas, a truly universal input scheme must have very narrow guard bands 115 or guard bands placed in unusable frequencies (preferred implementation). While multiple groups of exciters 421-424 and input demultiplexers 410 can be used to stagger the guard bands 115, as is done with the output multiple antenna scheme, a truly universal solution will have only one input demultiplexer 410. The design objective then is to minimize the width of the guard bands 115 in order to minimize unusable bands 1-16. Since the power level is low at the input, a more sophisticated and lossy design may be applied to improve this performance. Notch filters, including crystal resonators if needed, can be applied to the edges of the input passbands to sharpen the frequency response. The design must assure that an input signal is not present in two of the bands 1-16 simultaneously in order to avoid peculiar and potentially degrading phase cancellation performance impacts at the antenna output.

Undesirable effects of an autoplexer input signal being applied to two adjacent channels simultaneously may occur when the signal falls precisely on the boundary between two autoplexer bands. This effect may be eliminated by a variety of means known in the art and may include forbidding transmission in the guard bands and selecting guard bands at frequencies that are already forbidden for transmission for other reasons. Other means include designing individual diplexers as needed with a feature that allows a diplexer to instantly switch the guard band to a new frequency under system control. An input demultiplexer may be partitioned into odd and even demultiplexers, each mated with its respective odd and even output multiplexer.

Figure 6:
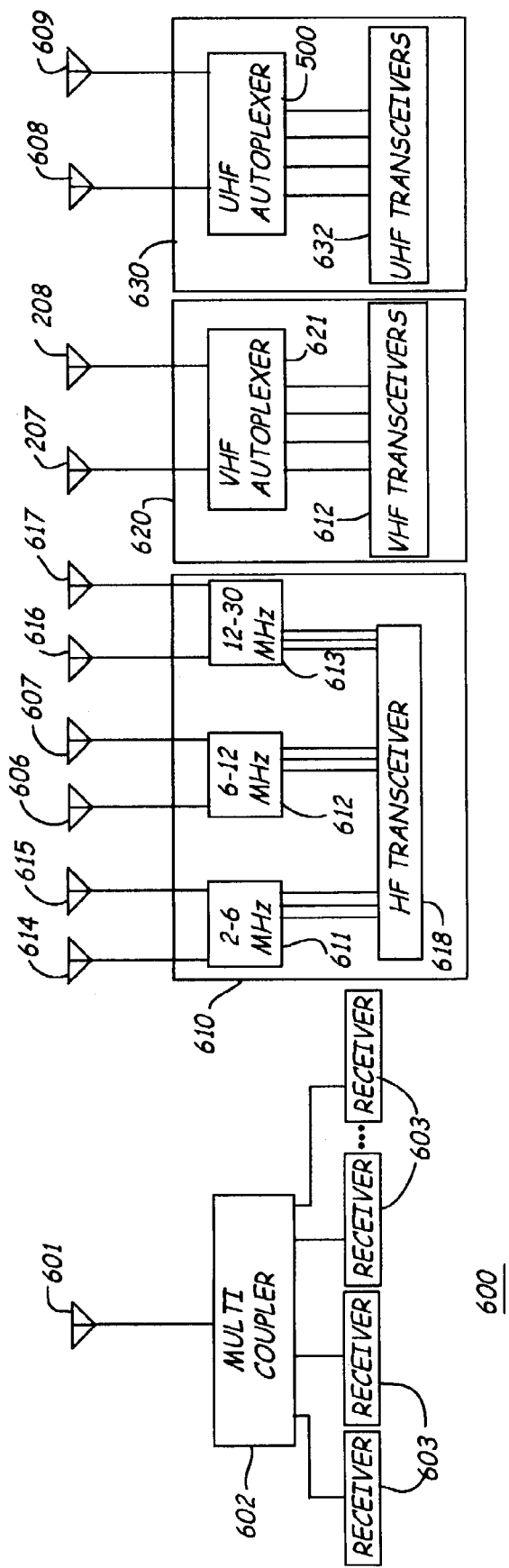
FIG. 6 is a block diagram of a shipboard communications system employing the autoplexers of the present invention.

For systems such as the US Navy shipboard communications system described above, coverage of the HF (2-30 MHz), VHF/CNR (Combat Net Radio) (30-88 MHz), VHF/ATC (Air Traffic Control) (118-137 MHz), VHF/LM (Land Mobile) (150-174 MHz), military UHF (225-400 MHz) and UHF/LM (Land Mobile) (400-470 MHz) bands is required. This is typically approached by banding the system into HF, VHF and UHF, although the VHF and UHF can conceivably be combined into one large system given that a combined VHF/UHF antenna is available. HF is unique and isolated from VHF/UHF solutions because of the 10-20-db higher power levels per channel (1000 watts typical), the four octaves of frequency coverage constituting the HF band, and the close frequency spacing. VHF/UHF is typically in the 5-25 watt per channel power range. FIG. 6 is a diagram of this shipboard system 600.

The shipboard system 600 is best served by separating a receive antenna 601 and multicoupler 603 with associated receivers 603 into a separate subsystem, preferably physically and electrically isolating the receive antenna 601 as far away from transmit antennas as possible. This is easier the fewer the transmit antennas there are on the same platform.

The approach to implementation of the autoplexers 400 and 500 to the shipboard system 600 is to build one autoplexer system 610 with associated antennas for the HF band, one autoplexer system 620 with its antennas for the VHF/CNR, VHF/ATC, and VHF/FM bands, and one autoplexer system 630 and antennas for the UHF and UHF/LM bands. Due to the nature of the multiplexer tree, the band edge diplexers have unlimited high pass or low pass (respectively) response, meaning that the UHF system 630 lowest band can also pass a VHF/CNR, VHF/FM, and VHF/ATC signal if the power amplifier and antennas 608 and 609 can accommodate it. Likewise, the VHF system 620 can pass all UHF services in its highest band, again limited only by the amplifier and antennas 207 and 208.

Due to the general necessity for the military to have access to all frequencies, that is, no disallowed channels due to guard bands, dual antenna autoplexers are assumed in all cases in order to stagger the guard bands between them as previously discussed.

A typical HF system 610 has 10% bands (both operating and guard), resulting in 27 diplexer bands total. The HF system 610 utilizes two antenna autoplexers is divided between two or three bands. Typical HF shipboard antennas are 2-6, 6-12 and 10-30 MHz, with the preponderance of operation in the 2-6-MHz surface wave band. Thus three autoplexer subsystems 611, 612, and 613 are constructed: a two-antenna subsystem for 2-6 MHz 611, a two-antenna subsystem for 6-12 MHz 612, and a two-antenna subsystem for 12-30 MHz 613. This requires multiplexer trees consisting of five/five, three/three, and three/three diplexers each, respectively, assuming equal 10% bands. Thus 22 diplexers (not shown) and six antennas 606, 607, 614, 615, 616, and 617 give simultaneous access to 28 HF bands divided into 10% bands. If power bank amplifiers are applied to each multiplexer band, then 44 or more HF transceivers 618 can be accommodated within the 22-diplexer system. Due to the size, weight, cost and power of HF amplifiers, it may be wiser to switch among multiplexer outputs by conventional switch matrix means, rather than having 22 amplifiers on line (unless there happened to be 22 amplifiers already there). In that case, a full autoplexer 500 would not be used, but rather just the output portion 300 or FIG. 3. The HF solution can be easily scaled to more or less bands, of wider or narrower bandwidth. A statistical analysis of the HF band must be done with much care and sophistication, because frequencies may not be equally distributed due to propagation factors.

A typical VHF system 620 in FIG. 6 is more challenging than the HF system 610. The primary use of VHF is the SINCGARS frequency hopping system for troop support.

There may be as many as 40 simultaneous nets in use. The total bandwidth available is 58 MHz. Frequency hopping is evenly distributed across all available channels on 25-kHz centers, subject to political frequency limitations (not an issue in event of full hostilities). In the case of SINCGARS VHF, a different design approach from HF is taken. Here the minimum power output per channel desired is started with. If 29 simultaneous transceivers 622 are assumed, 10-watts output per channel nominal, and statistically allow two channels per autoplexer band (40-watt PEP amplifier), then the VHF band can be divided into 15, 4-MHz wide multiplexer bands, each with a 40-watt PEP amplifier 405. Table 1 shows the statistical analysis for this particular combination. The dual antenna autoplexer 500 of FIG. 5 is a modified dual antenna autoplexer 621 with 14 diplexers 100 for the input demultiplexer 410 and 13 for the output multiplexers 305 and 310. Ideally, the input and output multiplexers will be common to hold down the life cycle cost (LCC). An amplifier of that power is approximately four-inches square plus heat sink fins and a 24-vdc power supply; all amplifiers cover the entire VHF band (thus identical), or even the VHF/UHF band for commonality. The same concept can be expanded to more/less bands and/or more/less power per amplifier depending upon the acceptable probability, based on the number of simultaneous active bands assumed, of attaining a selected minimum power output. An upper band can handle both VHF/ATC and VHF/FM, with the power dividing among SINC-GARS, ATC and FM depending upon how many are active at once. Another diplexer band can easily be added to isolate the ATC and/or FM bands if needed.

The UHF bands are similar to the VHF system 620 and all prior discussion of the VHF system 620 applies to the UHF system 630.

It is believed that the self-steering autoplexer for transmitter multicoupling of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A self-steering autoplexer for transmitter multicoupling comprising:
   a linear summer for summing a plurality of transmit signals at a plurality of transmit frequencies;
   an input demultiplexer connected to the linear summer and comprising a plurality of input diplexers for separating and routing the transmit signals by frequency;
   a plurality of amplifiers connected to the input demultiplexer and for amplifying the separated transmit signals from the input demultiplexer; and
   an output multiplexer connected to the plurality of amplifiers and comprising a plurality of diplexers for combining the amplified and separated transmit signals into a combined transmit signal for transmission by an antenna.

2. The self-steering autoplexer of claim 1 wherein the output multiplexer comprises:
   an even multiplexer for combining the amplified and separated transmit signals into even band transmit signals for transmission by an even band antenna; and
   an odd multiplexer for combining the amplified and separated transmit signals into odd band transmit signals for transmission by the antenna.

3. The self-steering autoplexer of claim 1 wherein the input diplexers of the input demultiplexer comprise diplexers connected such that the plurality of transmit signals at the plurality of frequencies from the linear summer are applied to outputs of the diplexers to separate the transmit signals into low and high frequency signals appearing at inputs of the diplexers.

4. The self-steering autoplexer of claim 3 wherein the input diplexers comprise:
   low pass filters for passing low frequency transmit signals; and
   high pass filters for passing high frequency signals and connected to the low pass filters and having the plurality of transmit signals applied to the high pass filter and low pass filter connections.

5. The self-steering autoplexer of claim 1 wherein each of the plurality diplexers comprises:
   a low pass filter for passing low frequency signals; and
   a high pass filter for passing high frequency signals wherein the low pass filter is connected to the high pass filter to provide the combined transmit signal.

6. The self-steering autoplexer of claim 1 wherein each of the plurality of diplexers comprises:
   a low frequency bandpass filter for passing low frequency signals; and
   a high frequency bandpass filter for passing high frequency signals wherein the low frequency bandpass filter is connected to the high frequency bandpass filter to provide the combined transmit signal.

7. The self-steering autoplexer of claim 1 wherein each of the plurality input diplexers comprises:
   a low pass filter for passing low frequency signals; and
   a high pass filter for passing high frequency signals wherein the low pass filter is connected to the high pass filter to provide the separated transmit signal.

8. A method of multicoupling a plurality of transmit signals from a plurality of transmit signal sources comprising the steps of:
   summing the plurality of transmit signals at a plurality of transmit frequencies in a linear summer;
   separating the transmit signals by frequency by using a plurality of input diplexers in an input demultiplexer connected to the linear summer;
   amplifying the separated transmit signals from the input demultiplexer with a plurality of amplifiers connected to the input demultiplexer; and
   combining the amplified and separated transmit signals into a combined transmit signal with a plurality of diplexers in an output multiplexer connected to the plurality of amplifiers for transmission by an antenna.

9. The method of multicoupling a plurality of transmit signals from a plurality of transmit signal sources of claim 8 wherein the output multiplexer performs the steps of:
   combining the amplified and separated transmit signals into even band transmit signals for transmission by an even band antenna with an even multiplexer; and
   combining the amplified and separated transmit signals into odd band transmit signals for transmission by the antenna with an odd multiplexer.

10. The method of multicoupling a plurality of transmit signals from a plurality of transmit signal sources of claim 8 wherein the input diplexers of the input demultiplexer comprise diplexers connected such that the plurality of transmit signals at the plurality of frequencies from the linear summer are applied to outputs of the diplexers wherein said input diplexers perform the step of separating the transmit signals into low and high frequency signals appearing at inputs of the diplexers.

11. The method of multicoupling a plurality of transmit signals from a plurality of transmit signal sources of claim 10 wherein the input diplexers of the input demultiplexer perform the steps of:
applying the plurality of transmit signals to high pass filter and low pass filter connections;
passing low frequency transmit signals with the low pass filters; and
passing high frequency signals with a high pass filters connected to the low pass filters.

12. The method of multicoupling a plurality of transmit signals from a plurality of transmit signal sources of claim 8 wherein each of the plurality of diplexers of the output multiplexer perform the steps of:
passing low frequency signals with a low pass filter;
passing high frequency signals with a high pass filter; and
providing the combined transmit signal with an output from the low pass filter connected to the high pass filter.

13. A transmitter multicoupler for coupling a plurality of transmit signal into a combined signal said transmitter multicoupler comprising:
means for summing a plurality of transmit signals at a plurality of transmit frequencies;
means for separating and routing the plurality of transmit signals by frequency;
means for amplifying the separated transmit signals; and
means for combining the amplified and separated transmit signals into a combined transmit signal for transmission by an antenna.
wherein said means for combining the amplified and separated transmit signals into a combined transmit signal for transmission by an antenna comprises an output multiplexer connected to the plurality of amplifiers and comprising a plurality of diplexers for combining the amplified and separated transmit signals into a combined transmit signal.

14. The transmitter multicoupler for coupling a plurality of transmit signal into a combined signal of claim 13 wherein said means for summing a plurality of transmit signals at a plurality of transmit frequencies comprises a linear summer.

15. The transmitter multicoupler for coupling a plurality of transmit signal into a combined signal of claim 13 wherein said means for separating and routing the plurality of transmit signals by frequency comprises an input demultiplexer said input demultiplexer comprising a plurality of input diplexers for separating and routing the transmit signals by frequency.

16. The transmitter multicoupler for coupling a plurality of transmit signal into a combined signal of claim 13 wherein said means for amplifying the separated transmit signals comprises a plurality of amplifiers.

17. The transmitter multicoupler for coupling a plurality of transmit signals into a combined signal of claim 13 wherein said means for combining the amplified and separated transmit signals into a combined transmit signal for transmission by an antenna comprises an output multiplexer wherein said output multiplexer comprises:
an even multiplexer for combining the amplified and separated transmit signals into even band transmit signals for transmission by an even band antenna; and
an odd multiplexer for combining the amplified and separated transmit signals into odd band transmit signals for transmission by the antenna.

18. The transmitter multicoupler for coupling a plurality of transmit signals into a combined signal of claim 15 wherein the input diplexers of the input demultiplexer comprise diplexers connected such that the plurality of transmit signals at the plurality of frequencies from the linear summer are applied to outputs of the diplexers to separate the transmit signals into low and high frequency signals appearing at inputs of the diplexers.

19. The transmitter multicoupler for coupling a plurality of transmit signals into a combined signal of claim 18 wherein the input diplexers comprise:
low pass filters for passing low frequency transmit signals; and
high pass filters for passing high frequency signals connected to the low pass filters and having the plurality of transmit signals applied to the high pass filter and low pass filter connections.

\* \* \* \* \*